(12) United States Patent
Billings et al.

(10) Patent No.: US 8,577,794 B2
(45) Date of Patent: Nov. 5, 2013

(54) SYSTEM AND METHOD FOR COLLECTING INFORMATION TO FACILITATE ENROLLMENT IN AN ELECTRONIC FUNDS TRANSFER PROGRAM

(75) Inventors: Sarah T. Billings, Chicago, IL (US); Laura J. Listwan, Westmont, IL (US); Brad A. Lower, Winston-Salem, NC (US); Cynthia E. Murray, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 2321 days.

(21) Appl. No.: 09/983,529

(22) Filed: Oct. 24, 2001

(65) Prior Publication Data

US 2002/0087344 A1    Jul. 4, 2002

Related U.S. Application Data

(60) Provisional application No. 60/242,682, filed on Oct. 24, 2000.

(51) Int. Cl.
*G06Q 40/00* (2012.01)
(52) U.S. Cl.
USPC .............................................. 705/39; 705/35

(58) Field of Classification Search
USPC .............................................. 705/4, 3, 40, 39
See application file for complete search history.

(56) References Cited

U.S. PATENT DOCUMENTS

| 5,649,117 A | 7/1997 | Landry ........................ 395/240 |
| 5,684,965 A | 11/1997 | Pickering ..................... 395/234 |
| 5,699,528 A | 12/1997 | Hogan .......................... 395/240 |
| 6,173,272 B1 * | 1/2001 | Thomas et al. ................ 705/42 |
| 6,289,348 B1 | 9/2001 | Richard et al. ................ 707/10 |
| 6,721,716 B1 * | 4/2004 | Gross ............................ 705/40 |
| 2002/0082962 A1 * | 6/2002 | Farris et al. ................... 705/35 |

* cited by examiner

*Primary Examiner* — Ojo O Oyebisi
(74) *Attorney, Agent, or Firm* — Banner & Witcoff, Ltd.; Michael A. Springs

(57) ABSTRACT

A system and method for collecting information to facilitate enrollment in an electronic funds transfer program includes a system operator that solicits prospective participants in the electronic funds transfer program and directs those prospective participants to an enrollment process that is accessible via the Internet. The prospective participants input profile information, which is preferably authenticated, and thereby enrolls in the electronic funds transfer program. Subsequent to enrollment automatic electronic funds transfers between an enrollee and another party are initiated on a periodic basis in accordance with the profile information. The system operator maintains a database that stores and operates on the profile information.

72 Claims, 7 Drawing Sheets

PROFILE

TO ENROLL IN THE ELECTRONIC PAYMENT PROGRAM, PLEASE PROVIDE THE FOLLOWING INFORMATION (*INDICATES OPTIONAL FIELD):

| | |
|---|---|
| LOGIN ID: | XXXXXXXXXXXXX |
| COMPANY NAME | XXXXXX |
| PLEASE SELECT YOUR INDUSTRY CLASSIFICATION | MANUFACTURING ▼ |
| PLEASE INDICATE WHETHER PROFIT OR NON-PROFIT ORGANIZATION | ● PROFIT<br>○ NON PROFIT |

PLEASE NOTE: CONTACT INFORMATION SHOULD DESIGNATE A PERSON RESPONSIBLE FOR AUTHORIZING DIRECT DEPOSIT PAYMENTS.

| | |
|---|---|
| CONTACT FIRST NAME: | XXXXXXX |
| CONTACT LAST NAME: | XXXXXXX |

FIGURE 7

SYSTEM AND METHOD FOR COLLECTING INFORMATION TO FACILITATE ENROLLMENT IN AN ELECTRONIC FUNDS TRANSFER PROGRAM

This application claims the benefit of U.S. Provisional Application No. 60/242,682 filed Oct. 24, 2001, which is herein incorporated by reference in its entirety.

NOTICE OF COPYRIGHTED MATERIAL IN DISCLOSURE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates to financial transaction systems, and in particular to a system for enrolling individuals or businesses in an automated electronic funds transfer program or plan.

2. Background of the Invention

It is often desirable to have a have automated payments made to various entities on behalf of an individual or organization. For example, employees who receive periodic payroll payments, can not only request that these payments be electronically transferred to a particular bank account, but some employees also may have the ability to route predetermined portions of their payroll payments to different accounts or retirement investments. To effect any such automated payment routing, it is typical that the employee must fill out cumbersome paper work and authorizations so that the employer can properly and legally effect the desired payment routing.

It is also quite cumbersome to arrange for a one-time or periodic payment to non-profit organizations that have solicited donations and underwriting. To effect such donations or underwriting a donor must typically write a check either one time or on a periodic basis. More sophisticated non-profit organizations might also run an accounting department that sends out reminder letters or "bills" to donors. As can be readily appreciated, both donors and non-profit organizations are burdened by tremendous amounts of paperwork associated with collections donations.

Furthermore, as a direct consequence of the explosive growth in electronic commerce, it is increasingly desirable, and sometimes even necessary, to transfer "electronic funds" through networked computers that are linked as part of a private network and/or, increasingly as part of the Global Information Network (GIN) or Internet. However, many customers find it cumbersome to repeatedly provide account information such as account numbers and the like, which is information that is typically required to initiate electronic funds transfer processes. At present, the inconvenience and inability to directly capture, qualify, and securely store customer data is an obstacle to the use and expansion of an organization's (including non-profit organizations), a corporation's or emarketplace's migration to electronic payment usage.

Automated, electronic payments offer several advantages including: cost, predictability, accuracy, convenience to a user and control over timing. Expanded use of automated electronic payments has been impeded, however, by the usually cumbersome process of obtaining necessary information from the customer, including transaction routing information. Thus, there is a need for effective methods of facilitating increased use of automated electronic payments to both facilitate the migration to ecommerce as well as to make conventional commerce (including repetitive or one-time bill payments, donations, and the like) more efficient. The present invention is designed for that purpose.

As noted above, it is presently cumbersome to, for example, effect electronic payment routing and to manage or keep track of donations. The advent of the Internet, however, has led to some improvements in electronic payments. The most common approach of, for example, e-commerce sites is to collect customer information at the time of each transaction or store customer information on a site-by-site basis. Both approaches, however, can inhibit the customer from executing the transaction. A customer may be unwilling to reveal financial information if he or she lacks confidence in the site operator, as may happen when a new vendor is not well known to the customer. In addition, it is tedious and inconvenient for a customer to enter the same information repeatedly in different sites, thereby causing resistance to using new vendors or vendors that require input of financial information for every transaction. There is also a need for an improved system and method for converting non-e-commerce payment-centric initiatives from paper-based, manual methods to an electronic system approach. Simplification of the automated electronic payment process as embodied in the present invention eliminates or minimizes these impediments to electronic payments.

SUMMARY OF THE INVENTION

The present invention, also referred to herein as "EC Enroll" or simply the "Invention," addresses the need for faster and simpler electronic funds transfer (EFT) by providing an improved system and method by which ultimate customers (or "Enrollees") may input data needed to process electronic transactions generally and EFT transactions in particular.

There are three classes of users of or parties to the Invention:

ENROLLEE—The Enrollee is the ultimate, targeted end user of EC Enroll. The Enrollee's primary interaction with the system is the enrollment process. Enrollees are specifically associated with Clients and Client applications.

CLIENT—Clients represent the first tier Clients to the SYSOP and the immediate consumer (customer) of EC Enroll. Typically this group consists of users that are external to the SYSOP organization. Clients have the ability to manage Client-specific data and data for their Enrollees.

SYSOP—The system operator (e.g., a bank or internal group within a bank) that has complete administrative control over all modules and functions of the Invention.

More specifically, the Invention provides a system and method that support a web-based service designed to securely enable all types of enrollment, data gathering, and payment processing online. The Invention provides unique web addresses and a customized Client application web site built for each Client to automate the administration of cumbersome enrollment processes associated with enrollment in direct debit collection programs, EDI payment programs, direct deposit programs and the like.

In a preferred embodiment, the system handles all facets of administration, including the processing of paper enrollment forms to final processing of electronic automated clearing house (ACH) payments or credit card payments. The data is maintained securely by the SYSOP in a database, but in the preferred embodiment each Client's authorized representatives have access to their information at any time via, e.g., a web-enabled administrative interface.

In another embodiment, the SYSOP also arranges for, manages, or at least facilitates the solicitation of a Client's customer's or trading partners to participate in the EC Enroll system.

EC Enroll may be used by a variety of Clients who desire to simplify the process whereby their customers (the Enrollees) can enroll in an EFT program. Such Clients could be for-profit companies involved in sales of products or services, nonprofit organizations coordinating a find-raising effort, governmental institutions organizing systematic payments to outside vendors, or many other users. (For convenience, these users are referred to herein as "Clients".) Client businesses might include, for example, mortgage providers or lease payment recipients, not-for-profit businesses, utilities, and, telecommunication businesses.

The universe of Enrollees can vary from individuals, to small groups such as membership clubs to groups consisting of hundreds of thousands or millions of individuals or entities.

The characteristic features of the Invention's system and method include a distributed data input function to alleviate the burden of data entry and improve accuracy through direct data entry by the Enrollee and verification of data being entered instantaneously, both online and offline. This ensures conformity to known standards and greater data accuracy.

Also, data entered is validated through the use of both online and offline processes. The offline validation processes within ACH is referred to as prenotification, and the system allows errors or exceptions to be corrected automatically to the greatest extent possible. An added attraction of the system and method embodied in the Invention is that it contemplates making use of the facilities of a particular system operator (a "SYSOP"), which is expected to be identified by the provider to the Enrollee: the reputation of the SYSOP, which might be, for example, a reputable financial institution, is expected to enhance the Enrollee's confidence in the security of the enrollment site and thereby encourage increased usage. On the other hand, some Clients may choose to mask the SYSOP entirely from an Enrollee's perspective.

Another of the benefits of the Invention is that it can adapt so easily to increased usage: because the data input is distributed to the Enrollee and because features of the Invention permit instantaneous validation and correction of the input data, the provider or the Client is not burdened with additional data-input expense. The present invention, therefore, provides significant scalability to a Client's electronic payment program—that is, Clients are able to increase the scale of the use of the system without significant increase in the cost of maintaining it. In other words, enrollment into a Client's electronic payment program can be significantly foreshortened due to the ability to accept a large number of simultaneous sessions due to the elimination of manual, rate-limiting processes.

EC Enroll has its origins in a program developed to fill a specific need by the State of Illinois. Burdened by the administrative complexity and expense of processing billing by and payments to as many as 750,000 vendors, the State of Illinois requested financial partners to develop an electronic system to obtain payment information and routing instructions. The present inventors designed a system whereby the SYSOP would solicit the State's Enrollees (in that case, vendors) to come to an enrollment site and furnish information that would allow the SYSOP to make ACH-based credits to their accounts instead of cutting paper checks. Although derived from that system, the Invention is more widely applicable. In particular, the Invention contemplates that the SYSOP can not only credit vendor accounts but can also credit and debit other customers' accounts. In addition, the system is not limited to ACH credits, but can also be used with credit cards and other methods of payment. This is accomplished by collecting all necessary information (e.g., credit card number, bank account number) during the enrollment process.

The system and method for facilitating enrollment in electronic commerce are flexible and modular and thus applicable to a broad range of customers and applications. Among other things, the system is applicable to collection applications (such as collecting donations) and payment applications.

The front end of the system is a customized web site for collecting data, preferably by allowing customers to post their own information. The information may include: account number information, credit card number and expiration date information and customer preferences. The back end of the system comprises a database (which may be in more than one physical location), software and communication links to the Global Information Network (GIN) or Internet.

The system includes software for implementing a method of validation of data input by customers. The validation can be performed offline and/or online. Validation software simplifies the process for Enrollees.

By allowing individuals or businesses (Enrollees) to input their own data in a controlled way, the system allows the Client (the SYSOP's client) to shift the burden of data entry and update to the Client's customers, the Enrollees who initiate the EFTs.

Also, distributing the data input function makes the system scalable since adding Enrollees does not significantly increase the burden of data entry on any party.

Because of its design and scalability, EC Enroll facilitates a greater variety of EFT. For example, the Invention allows debits and credits of Enrollee's accounts and is easily implemented. Consequently, Clients can use the system to pay their Enrollees as well as be paid by Enrollees. This naturally makes the system of the Invention useful in a far greater range of EFT than simple bill payment and presentment systems.

In addition, the database of the Invention is designed to collect a wide variety of information. Thus, the system can be used to collect different information for different Clients by simply specifying what data fields are required for each Client. Apart from facilitating the EFT, this feature is valuable to the Client/EFT recipient because it compiles and organizes important information about the preferences and identity of the Enrollee.

The system further preferably includes payment processing engines to process transactions using information from the database. The system can also generate "prenotes" automatically to test and correct the data in the database.

In its entirety, the system can be used to automatically perform the steps or functions required to solicit, enroll, validate and make transactions. In particular, the system performs the steps of: providing a means for Enrollees to input the required data in an enrollment session (which is preferably conducted online); verifying, in real time, that the data entered conforms to known standards; alerting the Enrollee as to deviations from known standards and possible errors to obtain corrected data in real time; saving the information entered by the Enrollee in a database; subsequently generating a "prenote" (in ACH transactions) using data retrieved from the database to test the accuracy and sufficiency of the information stored; and taking corrective measures (automatically if possible and with manual intervention if necessary) until the accuracy and the sufficiency of the data is confirmed. Preferably, the SYSOP is a trusted gatherer of information (such as a bank) so that the SYSOP's credibility is reflected on its Clients and Enrollees have confidence in the security of the enrollment web site. However, the SYSOP need not necessarily be exposed to the enrollee, whereby the Enrollee is under the impression that the Client is operating system.

The system of the Invention is particularly, but not exclusively, useful for recurring payments, ACH direct debits, and services plan fees (such as those associated with e.g., cable television service, Internet service or telephone service).

In the currently preferred embodiment, the system architecture comprises a front end and a back end. The front end is in the form of a web site for each Client and the back end of the system comprises a database. The front-end enrollment input interface or process can be customized to meet a Client's needs or preferences. Thus, forms (e.g., web pages) employed in the enrollment process can include the Client's logo, or become part of the Client's home web page. In this way, the visual presentation for each Client takes on the look and feel of each Client. In the preferred embodiment, the front end includes a hyperlink to the system so that the system GUI is displayed within the same browser window. Alternatively, the system could open a window within the company's (Client's) web site so that when the Enrollee finishes the enrollment process in that window and closes the window, the Enrollee is returned to the Client's page where she or he started.

The database architecture includes a wide variety of standard data fields and further includes custom fields to collect information desired by a Client. The standard data fields include data fields for information that is widely used in this Invention such as banking data, account numbers, transit routing numbers and/or credit card numbers and expiration dates. The "custom fields" are useful when a Client is interested in collecting information specific to a Client's situation. For instance, a Client running a promotion may want to know an Enrollee's T-shirt size or color. In a more sophisticated example, a Client may want to know how an Enrollee's name should read in a publication reporting the Enrollee's donation. This type of information can be collected in a custom field for that Client.

The system can receive large-scale downloads of data from other databases. Such data can then be used to "seed" one or more forms that are presented to an Enrollee during the enrollment process. For example, the SYSOP could download all of a utility company's customer payment file information, including utility account numbers, into the system database. An account number, which is seeded on a form, could be used as a password and, in combination with a personal identification number (PIN) input by the Enrollee, the enrollment process can proceed more efficiently.

In addition to the common database, the system includes separate software layers for batch processing and data normalization, business logic and the presentation layer, namely a web site. All functional rules governing the gathering of data reside in the presentation layer on a Client by Client basis. Finally, the system can display administrative screens that allow both the SYSOP (e.g., bank administrators) and the Client to access data according to specified privileges.

The system architecture, which provides for direct data entry by Enrollees, is an important aspect of the Invention. Because the data is input into a database in a normalized fashion by a large number of people inputting their own information, adding Enrollees does not increase the data entry burden for anyone. For this reason, the system architecture is highly scalable.

Moreover, data accuracy is improved because data is input directly by the Enrollee and because conformity to known or expected standards can be verified in real time, online. In particular, Enrollees can be directed to enter data in a specified format through a user friendly interface. In this way, the Invention avoids input errors by editing input wherever possible to detect and eliminate typos and transposed numbers, too few digits in an account number and other verifiable errors. Naturally, the ability of the system to verify that data input conforms to known or expected standards is limited by the SYSOP's knowledge of such known or expected standards. Thus, in some cases, Client specific data fields may not be as easily verified based on known or expected standards as can such information as the configuration of account numbers at a particular bank or credit card company. However, it is preferable that as much data verification be accomplished by the SYSOP as possible.

To verify specific information, the system further includes the ability to generate a sample EFT batch process request or "prenote." The prenote is sent through the EFT system to determine whether the data in the system is accurate and sufficient to process the EFT request. If the data in the database is inaccurate or insufficient to process the automated electronic payment request, the automated electronic payment system will generate an "exception" report that is sent to the SYSOP. In the case of ACH transactions, for example, there are two types of exceptions that result from ACH prenotes or ACH live transactions. The first type of exception is a "notification of change" notice, and the second is a "return."

A "notification of change" means the target institution received the sample EFT request, but the EFT request did not post automatically and was thus, at least initially, rejected by the target institution. Nevertheless, the target institution was able to determine (e.g., from the name of the individual and the account number entered) what was intended and, accordingly, not only conveyed the error notice but also provided the correct information. For instance, the target institution might be able to tell that the EFT request was intended for Joe Smith's account, determine that the account number in the database was one digit off from Joe Smith's account number and send the correct information to the system. As another example, a transit routing number may have been changed due to a bank merger. Thus, in response to a notification of change, either on prenotes or on live transactions, the system is preferably able to automatically correct the data contained in the database.

A "return," on the other hand, means the target institution received an incorrect EFT request but cannot process the transaction due to, e.g., unavailable funds, an account closed situation or lack of clarity as to the destination. Thus, the EFT request is returned and the data must be corrected by contacting the Enrollee before being resubmitted. In response to a "return," the system will preferably reconcile the exception back to the information that was input from the Enrollee and then queue the information on a service representative's screen so that the representative can contact the Enrollee to clarify and correct the discrepancy.

The system can also be used to perform a variety of distribution functions, beyond mere web enrollment, using data collected. For instance, the system can be used to mail letters on a Client's letterhead asking all prospective Enrollees to go to the enrollment site and enroll in the Client's direct debit program. A paper enrollment form could be included with the letter to allow those people who will never go on the web to enroll in the program. The SYSOP could input data from paper forms to put the information into the system database.

It is therefore an object of the present invention to provide a system and method that provides facilitated enrollment in electronic funds transfer programs.

It is also an object of the present invention to provide a system and method that distributes much of the process of enrollment to the enrollees themselves.

It is still another object of the present invention to provide web-enabled system and method for enrollment in an electronic funds transfer program.

It is an object of the present invention to provide an electronic funds transfer program enrollment method and system in which the data that is entered by enrollees is validated to ensure that sufficient information has been made available to implement EFT for a particular enrollee.

It is also an object of the present invention to provide an electronic funds transfer plan enrollment method and system wherein a trusted third party, such as a bank, administers the plan for one or more clients.

It is still another object of the present invention to provide a system and method for providing an electronic funds transfer program in which enrollees, which enroll in the electronic funds transfer program of one entity, can have the information associated with that enrollment associated with other entities without having to re-enter the same information.

These and other objects of the present invention will become apparent to those skilled in the art upon a reading of the detailed description of the invention in conjunction with the associated drawings.

BRIEF DESCRIPTION OF THE DRAWINGS

FIG. 7 illustrates an exemplary profile information input web page in accordance with the present invention.

DETAILED DESCRIPTION OF THE INVENTION

Figure 1:
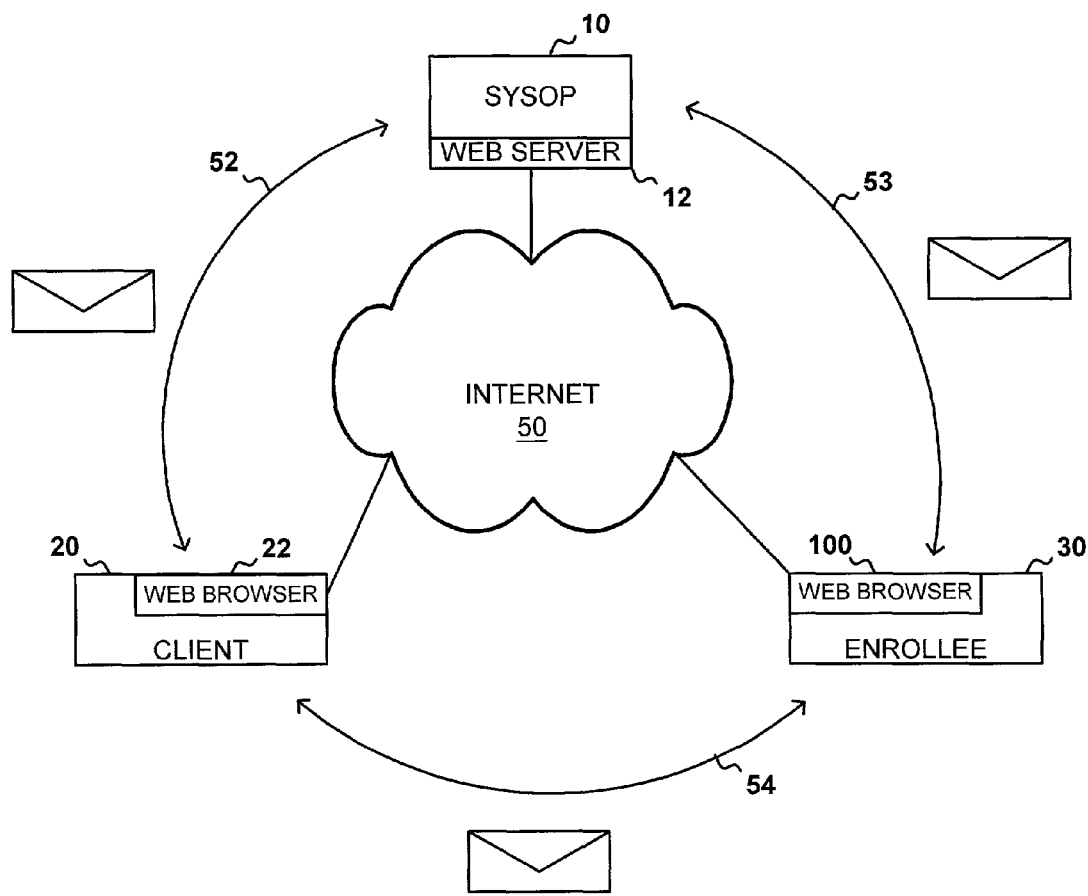
FIG. 1 depicts the three central players that participate in the system and method of the present invention.

FIG. 1 depicts the three central parties that are involved in the system and method of the present invention. The parties include a system operator (SYSOP) 10, which can be a bank or any other trusted party that can gain access to an electronic payment system, Client 20 such as a business, corporation or government institution, and Enrollee 30, such as a vendor or individual donor. Each of these parties 10, 20, 30 communicates with each other as necessary to exploit the inventive features of EC Enroll. Preferably, communication is accomplished electronically via a public electronic network, such as the Internet 50, using well-known protocols such as TCP/IP and employing HTML, for example, to present and capture information via web browsers. In this context, SYSOP 10 preferably comprises a world wide web server 12 and Client 20 and Enrollee 30 each have access to a web browser 22, 32. Electronic mail, or email, may also be employed to promote electronic communication. Where electronic communication is not possible or is undesirable, conventional paper mail channels 52, 53, 54 may be employed between the parties.

The present invention provides flexible service that can be used for both collection and disbursement programs. In a preferred embodiment, the present invention is used to create a unique web site for a company to collect pertinent information from Enrollees, including entities or people (e.g., vendors or donors) that do business with or are somehow associated with a Client (e.g., a company). Of course, in addition to the convenience and security of an on-line enrollment option via the web site, a participant or Enrollee 30 can enroll using a conventional paper enrollment form.

The present invention is a modular, comprehensive solution in the sense that every function, from solicitation and enrollment to payment processing and continuous database administration can be performed via an integrated system in a scalable fashion.

More specifically, there is provided a system that develops and maintains a web site for a client 20 (company) to collect appropriate information from enrollees 30 (participants). The web site is preferably branded with a (e.g., a corporate) logo, colors and/or other elements of a client's identity, whereby the site can be seamlessly linked to an existing web site or used as a stand-alone web site. Access to the site is preferably controlled with a client identification (ID) and a password, such as a client account number, tax payer id number or system-generated password. In accordance with the present invention, either SYSOP 10 or Client 20 notifies prospective Enrollees 30 of the availability of on-line enrollment for a particular electronic payment program. Such notifications or solicitations may be in the form of conventional paper letters, email, "statement stuffers" and/or notices on the client's web site.

Even if an Enrollee 30 chooses to enroll in the offered program via conventional mail, the information that is provided by that Enrollee 30 is preferably keyed into a database at SYSOP 10 or by Client 20.

To enroll in an offered electronic collection program, including ACH direct debit and credit card collection, an enrollee provides the necessary sign-up information at a web site. Typically, Enrollees 30 enter simple information such as name, address, email, telephone number and a unique identification number (where applicable). Based on the needs of the client (i.e., the business), enrollees can choose a payment type (e.g., ACH debit or credit card), a payment frequency (e.g., one time, weekly, monthly, annually), and a payment amount. Enrollees 30 preferably also provide the appropriate banking information, including bank transit routing number and account number, or credit card number and expiration date. In addition, the particular Client 20 (or SYSOP 10) can include customized forms on its web site in connection with the enrollment forms to request additional information specific to the operations or desires of a particular Client 20.

Ultimately, at the request of Client 20, SYSOP 10 uses the information collected by the enrollment process to initiate ACH and credit card debits on the client's behalf. Both repetitive and one-time payments can be initiated according to the frequency, payment types and dollar amounts authorized by each Enrollee 30. For variable payment amounts, for example, Client 20 can merge information collected through the enrollment process with payment amounts and/or due dates for each payment cycle and send the resulting payment file to SYSOP 10 for processing. Alternatively, Client 20 can transmit the variable payment amounts to SYSOP 10 where they are matched with payment information. Thereafter, the payment transaction is initiated.

Figure 2:
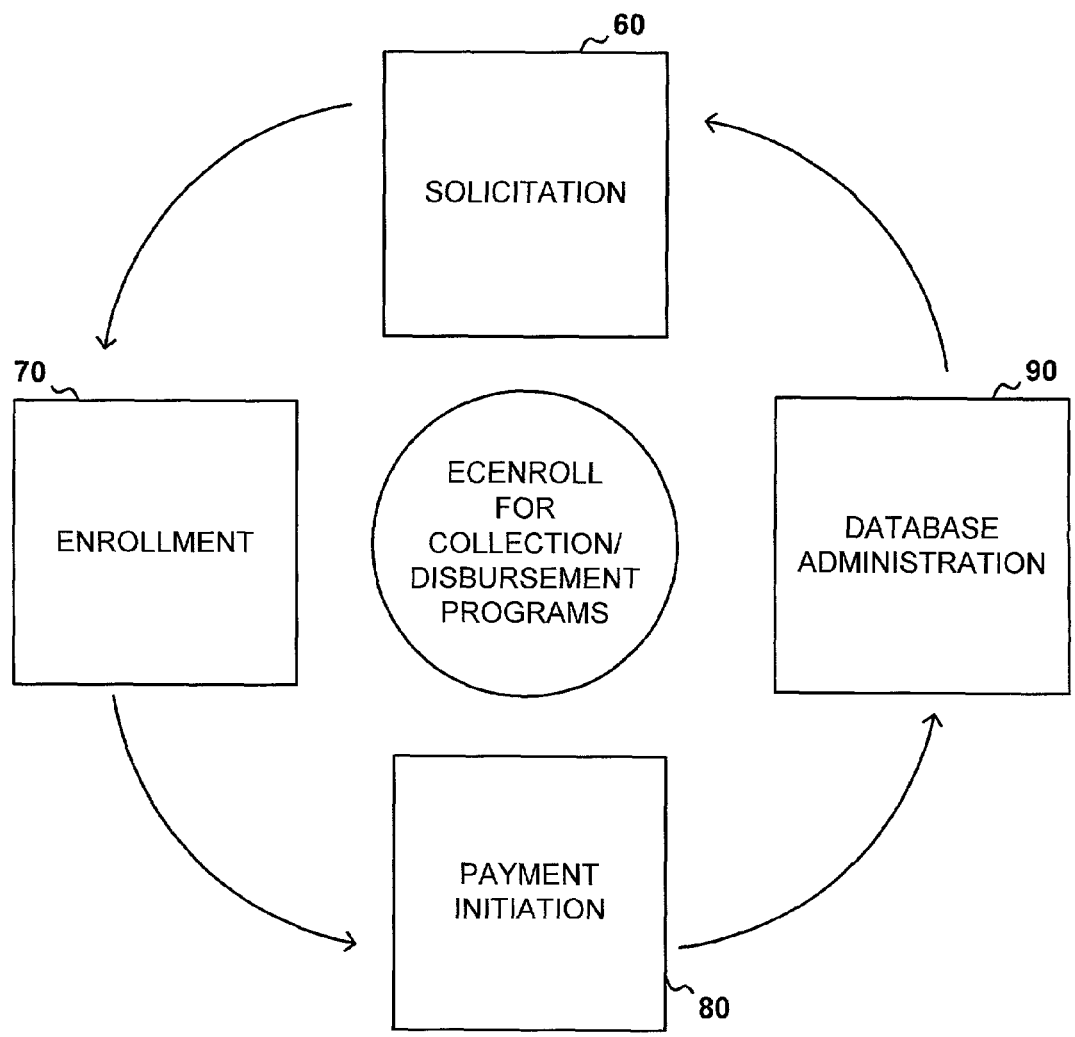
FIG. 2 illustrates an iterative solicitation, enrollment, payment initiation and database administration process in accordance with the present invention.

FIG. 2 depicts an overall, high level, iterative process in accordance with the present invention. Specifically, FIG. 2 shows the steps of solicitation 60, enrollment 70, payment initiation 80, and database administration 90. As mentioned, the step of solicitation, i.e., requesting that vendors enroll, can be performed by Client 20 itself or SYSOP 10 with the authorization of Client 20. The step of enrollment 70 is preferably accomplished on-line with direct interaction with an Enrollee 30. However, as stated, paper-based enrollment is also within the scope of the present invention, but information provided via paper enrollment will ultimately find its way to being keyed into a database as will be described later herein. The step of payment initiation 80 is then automatically performed based on the information provided by each Enrollee 30 in view of any particular terms required by Client 20. Finally, database administration 90 is preferably performed by Client 20, but can also be performed by SYSOP 10, whereby SYSOP and Clients can continuously access their Enrollee database records for real time updating and monitoring of changeable enrollee information.

The present invention as described thus far is also particularly suitable for enhancing electronic disbursement programs, including EDI or ACH direct deposit. Rather than completing paper enrollment forms as is conventional, payees and trading partners (potential enrollees) preferably enroll on-line at a client's web site. Such Enrollees 30 also preferably enter information such as name, address, email, telephone and an unique identification number. Payees preferably also provide appropriate banking information, including bank and transit routing number and the account number to which future payments should be directed. Again, customized data fields can be included on the web site to request additional information specific to a particular Client 20.

Regardless of whether the system is employed for electronic collection or disbursement programs, information captured on-line, specifically the banking and payment components, is preferably validated by SYSOP 10 prior to, or shortly after, populating the database records associated with Client 20. For example, ACH pre-notes, credit card authorizations, along with other business rule edits such as whether an ID is all numeric and 5 digits, or whther transit routing numbers are 9 digits and all numeric, are preferably used to validate data that is entered by each Enrollee 30. Also, on-line sessions are preferably encrypted using well-known secure sockets layer (SSL) encryption. Databases and web servers associated with SYSOP 10 are preferably both physically and virtually secured with only authorized individuals having access to underlying applications. Also, privileged-based user access is preferably employed to allow for segregation of duties and dual authorization, thereby enhancing overall security.

In addition to the above-mentioned validation tools, a preferred embodiment of the Invention comprises real time credit card authorization and settlement for a full payment amount, as opposed to, e.g., a representative one dollar amount that might be employed only to confirm account information. Also, rather than limiting validation to determining whether a particular piece of data is numeric only (e.g., in the case of a routing number), the Invention preferably comprises the capability to verify that the numeric value actually corresponds to a real bank. This could be accomplished by maintaining a database with all banks, for example, along with their repsective routing numbers.

Once the information from the several payees or trading partners (i.e., Enrollees 30) has been collected via the enrollment process 70, Client 20 (in conjunction with SYSOP 10 where desired) initiates payment transactions at step 80. More specifically, using well-known data export techniques, Client 20 merges information collected via enrollment process 70 with payment amounts and due dates for each cycle and sends resulting payment files to SYSOP 10 for processing. Alternatively, SYSOP 10 can initiate payments of fixed amounts or of variable amounts if Client 20 transmits variable payment amounts and due dates to SYSOP 10.

Database administration 90 is preferably an ongoing process and includes, for example, maintaining accurate records and providing the opportunity to modify database records as client or enrollee information changes over time.

The present invention, as a consequence of collecting information from many Clients 20 and even more Enrollees 30, can become a central repository for participant information. Accordingly, where desired, authorized individuals at the particular Clients 20 can be given access to the information in one or more databases thereby making available valuable information that can be used for management decisions. Also, data stored in the various databases is preferably also exportable to other business applications, such as spreadsheets and word processors, accounts payable or accounts receivable systems or enterprise resource planning systems. Data export can be in EDI (Electronic Data Interchange) or BAI (Bank Administration Institute) formats.

Figure 3:
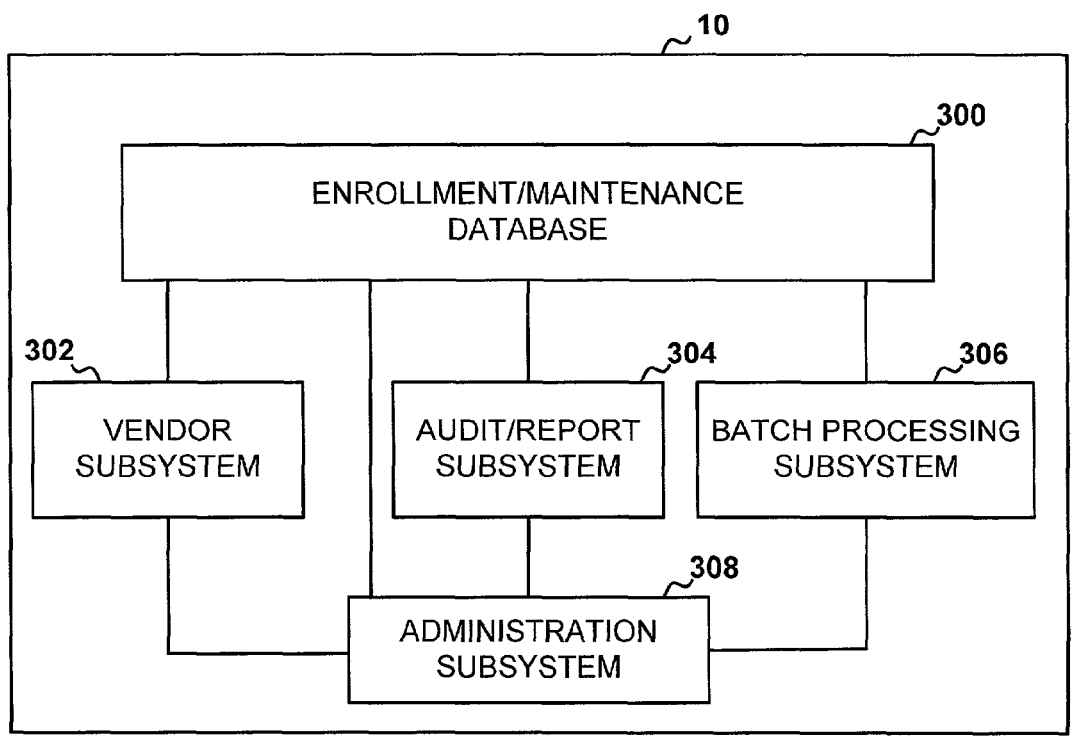
FIG. 3 is a schematic diagram of an exemplary implementation of the SYSOP in accordance with the present invention.

FIG. 3 depicts a high level functional diagram of SYSOP 10. Specifically, SYSOP 10 is responsible for providing a web site that allows vendors, donors, payees or payors (Enrollees 30) to enroll and maintain profile information. The profile information is then used, for example, to facilitate automated payments. To implement this functionality in accordance with the present invention, there is provided, as shown in FIG. 3, an enrollment/maintenance database 300, a vendor subsystem 302, an administrative subsystem 304, a batch processing subsystem 306 and an audit/reports subsystem 308. These components are in communication with each other to perform in the manner described below.

Enrollment/Maintenance Database

SYSOP 10 preferably includes a database 300 to store profile information, marketing data, personal identification numbers (PINs) and other information as will become apparent. The data defines Enrollee 30 information (in this case, as well as in FIGS. 4-6) such as vendor name, vendor address, email address, marketing information. Besides demographic data, enrollment/maintenance database 300 preferably also maintains the state of the profile data such as modification date, pre-note status, date of pre-note, that is, audit trail information. This database preferably also contains one time PINs issued to enrollees to update their profiles. To summarize, enrollment/maintenance database 300 preferably contains the following information: Client data, Enrollee data, profile data, payment request data, payment transaction data and audit trail data. In an embodiment of the Invention, there is also provided an automated file upload engine whereby Clients can upload files to the database 300 via, for example, a web-based portal.

Vendor Subsystem

Vendor subsystem 302 allows an Enrollee 30 (e.g., a vendor, donor or payee) to log on to a web site operated by SYSOP 10 or Client 20 and provide information to enroll in an electronic payment plan, as well as to gather or collect targeted marketing data, as desired. Thus, vendor subsystem 302, in accordance with the present invention, preferably comprises core functionality that is used to communicate with the potential Enrollee 30. Specifically, Enrollees 30 are preferably required to provide a vendor ID and PIN number to enter the web site and update their respective profiles. An authentication system preferably validates the PIN number provided by Enrollee 30 where password protection is applicable for a particular web site. Enrollees 30 preferably also have the capability, via vendor subsystem 302, to request new PIN numbers for use during subsequent visits to the web site. Of course, in some implementations, the use of a PIN is not necessary.

Enrollee 30 is also preferably able to view profile information in enrollment/maintenance database 300 and modify it as desired. Profile data can include information such as name, address, email, customer number, bank account number, routing/transit number, SSN. Further, Enrollees 30 are preferably able to review any changes before finalizing them and storing them in enrollment/maintenance database 300. Also, in a preferred embodiment, data is only accepted after Enrollee 30 accepts a legal declaration form presented to the enrollee in the course of the enrollment process. In the event Enrollee 30 does not accept the legal declaration form, the information is not updated in database 300 and the PIN that was assigned to the enrollee does not become expired. As a result, an Enrollee 30 can use the same PIN to enter the enrollment process 70 at a later time. Of course, depending on the particular context in which the present invention is operating, the acceptance of legal terms may not be desirable.

The present invention also preferably collects useful marketing information from enrollees via customized fields on the web site.

Administrator Subsystem

Administrators subsystem 304 allows designated users from SYSOP 10 to log into the system of the present invention and perform various tasks. This subsystem is preferably employed to create/update administrators and specify access control privileges for administrators. The subsystem is further preferably employed to import profile data into a profile database that describes Clients 20. Further, a task of the administrator subsystem 304 is to generate personal identification numbers (PINs) for vendors or Enrollees 30, as necessary. That is, the web site in accordance with the present invention preferably provides a utility that generates a one-time use PIN. Prospective Enrollees 30 are mailed the PIN information and can use the PIN to log on to the web site and access the enrollment process 70. Thus, by requiring an enrollee to use a unique PIN, which is provided to them via conventional mail or separate email, it is possible to increase the overall security of the web site and enrollment/maintenance database 300.

In addition to the foregoing, administrator subsystem 304 preferably provides a facility for administrators to search and view information submitted by individual Enrollees 30. Still further, administrator subsystem 304 preferably provides a facility for administrators to create new Enrollees 30 and edit existing enrollee information. This functionality permits enrollment of Enrollees 30 who might choose to enroll via conventional paper processes, rather than using the web site in accordance with the overall regime of the present invention. This functionality also permits paper participation for Enrollees whose data may have changed since enrollment. Also, administrator subsystem 304 is preferably able to provide a review and change validation facility so that administrators can have a security mechanism with respect to enrollee data and profile changes to prevent inadvertent updates to enrollee profiles or data.

Finally, administrator subsystem 304 preferably has the capability to trigger several batch processes, which are described next.

In a preferred implementation, administrator subsystem 304 is designed modularly with the following components: Security/Administration (enabling new administrators within the system), Search and Viewing (providing access to information submitted by individual enrollees), User Management (the ability to add new enrollees or change existing information, and Triggers (for triggering batch processes). And, each of these components can be exposed to Clients 20 individually, in groups, or collectively.

Batch Processing Subsystem

Batch processing subsystem 306 performs various tasks required for updating and maintaining data in enrollment/maintenance database 300. Batch processing can be triggered on a scheduled, periodic basis or on demand, via a web page provided to administrator users with the appropriate privileges.

The following functions are preferably supported by the Batch Processing Subsystem 306:

1. Import data from a client-provided file to enrollment/maintenance database 300. In this case, the Invention preferably provides a utility to read a predefined file format, extract business related information and import results into database 300. This data is preferably used to drive the overall system from several perspectives including an enrollee's perspective and an administrator's perspective.

2. Export data from the profile database to a prenotification file format. The Invention preferably provides a utility that exports records from database 300 to a separate storage area (e.g., another hard disk) in a predetermined prenotification file format. In a preferred implementation, the process generates a single file for multiple batches. This process preferably runs once per day and creates prenotification files and/or runs on demand via an administrator web page.

3. Import prenotification results from an exception table to the profile database. The Invention preferably has an import capability that interprets exception table returns from a separate prenotification system (not shown) and updates the records in database 300. The import procedure also preferably records a prenotification status, date modified and other relevant information as may be desired. Like the other batch processes, this process is preferably run once per day to update database 300, or the process is run on-demand via an administrator screen.

4. Export data to a pin-mailer file. The system and method in accordance with the present invention also preferably provides a utility to export data, which meets a pre-defined criteria, from a database to a standard formatted file. This file is used in a mail merge process, which results in a mailing that is sent to solicit potential Enrollees 30. The mailing preferably includes any necessary PIN so that the recipient of the letter can immediately access the enrollment process 70.

5. Export data to an authorization file. Further, batch processing subsystem 306 preferably provides an export utility to export data, which meets a pre-defined criteria, from the database 300 to an authorization file. The authorization file is provided to the several Clients 20 to update their respective systems. This process is also run once per day or on-demand at the request of an administrator.

With the foregoing batch processes, which are run at least one per day, it is possible to check data that is input by enrollees and monitor whether that data is sufficiently accurate to permit enrollees to properly enroll in the EFT program being offered. Where discrepancies or problems with the data are identified, personnel at SYSOP 10 can contact the enrollee and, hopefully, quickly resolve the discrepancy or problem.

Audit and Report Subsystem

The audit/report subsystem 308 preferably keeps audit trails of changes to the data in enrollment/maintenance database 300. Audits are preferably generated for creations/updates of administrator accounts, changes by administrators or enrollees to enrollee data, changes by batch processes to enroll data, and any other changes for which tracking may be desirable. Audits are also preferably performed with respect to vendor subsystem 302 for PIN generation, invalid logon and invalid PIN events. Resulting audit files are preferably located in enrollment/maintenance database 300 or in a separate database in communication therewith. Audit/report subsystem 308 preferably also provides a variety of reports such as accepted NOC reports and exception reports.

The functionality described thus far can be implemented with well-known software tools and technologies. In an actual implementation of the present invention, however, the following tools and technologies are employed. The SYSOP web server 12 is powered by an Internet Information Server (IIS). Web server 12 implements Secure Socket Layer (SSL) to encrypt data between the web server and a user's (Client 20 or Enrollee 30) browser.

Database 300 hosts other communication applications to communicate with external systems, such as a prenotification system, as required.

Active Server Pages (ASP) technology is used to dynamically generate Graphical User Interface (HTML web pages) required to implement the functionality of the present invention. ASP scripts use server objects wherever appropriate to implement business logic and handle database connectivity. Further, wherever appropriate, as would be apparent to those skilled in the art, this technology is used to develop reusable objects for EC Enroll. These COMs preferably encapsulate the bulk of the application logic as well as handle database connectivity.

In another actual implementation of the present invention, the following tools and technologies are employed. The SYSOP web server 12 is powered by various server applications. These run on servers. Web server 12 implements SSL to encrypt data between the web server and a user's browser. J2EE technology is used to dynamically generate Graphical User Interface (HTML web pages) required to implement the functionality of the present invention. JSP pages are used at the presentation layer which then interfaces with jar files that incorporate the business logic and tie into the data layer. Further, wherever appropriate, as would be apparent to those skilled in the art, J2EE technology is used to develop reusable objects for EC Enroll. These objects preferably encapsulate the bulk of the application logic as well as handle database connectivity.

The following section describes several web pages that may be presented via a web browser to an enrollee (e.g., a vendor to a Client in the case of FIGS. 4-6) or a SYSOP administrator. Web pages that are accessed from a common page are located at the same hierarchical level in the figures.

Figure 4:
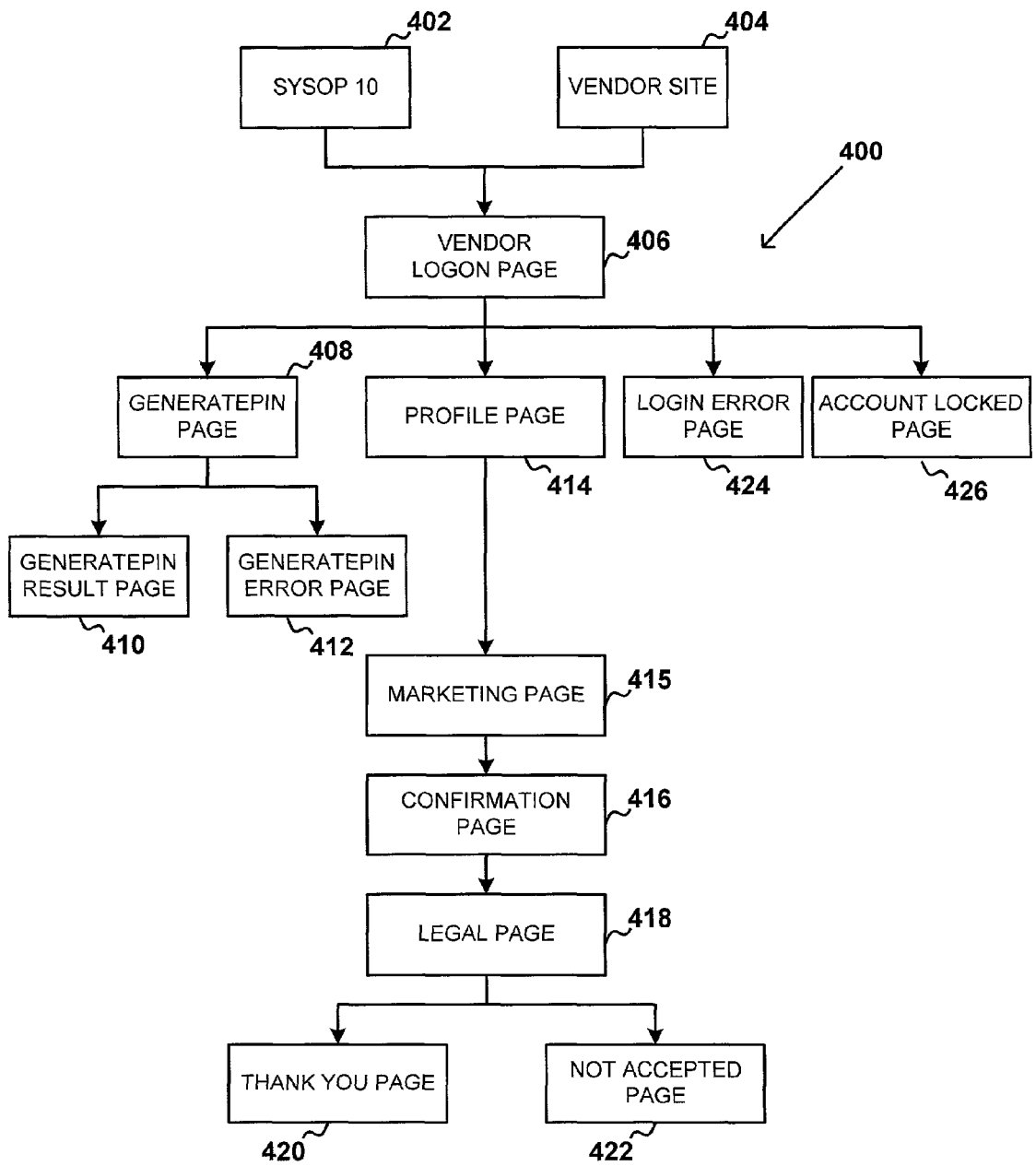
FIGS. 4 and 5 are hierarchical schematic diagrams illustrating the types of web pages presented to users in accordance with the present invention.

FIG. 4 depicts an exemplary vendor subsystem hierarchy 400, which is preferably implemented by vendor subsystem 302, in accordance with the present invention. Specifically, a Vendor Logon Page 406 can be accessed from either a SYSOP 10 Home Site 402 or a Vendor Site 404. The Vendor Logon Page 406 permits access to a Generate PIN Page 408, a Profile Page 414, a Log-In Error Page 424 and an Account Locked Page 426. The Generate PIN Page 408 leads to a Generate PIN Result Page 410 or a Generate PIN Error Page 412. The Profile Page, via which an Enrollee 30 preferably provides enrollment information leads to a Marketing Page 415, as desired by a particular Client 20, a Confirmation Page 416 at which an Enrollee 30 can confirm the information that has been input, and a Legal Page 418, which includes legal information pertaining to the electronic collection and/or disbursement programs in which the enrollee is enrolling. The Legal Page 418 leads to either a Thank You Page 420 or a Not Accepted Page 422. Pages 424 and 426, respectively, cover the instances where there is a log-in error or a vendor's account has been locked. The actual enrollment process is described more fully later herein in conjunction with FIG. 6.

Figure 5:
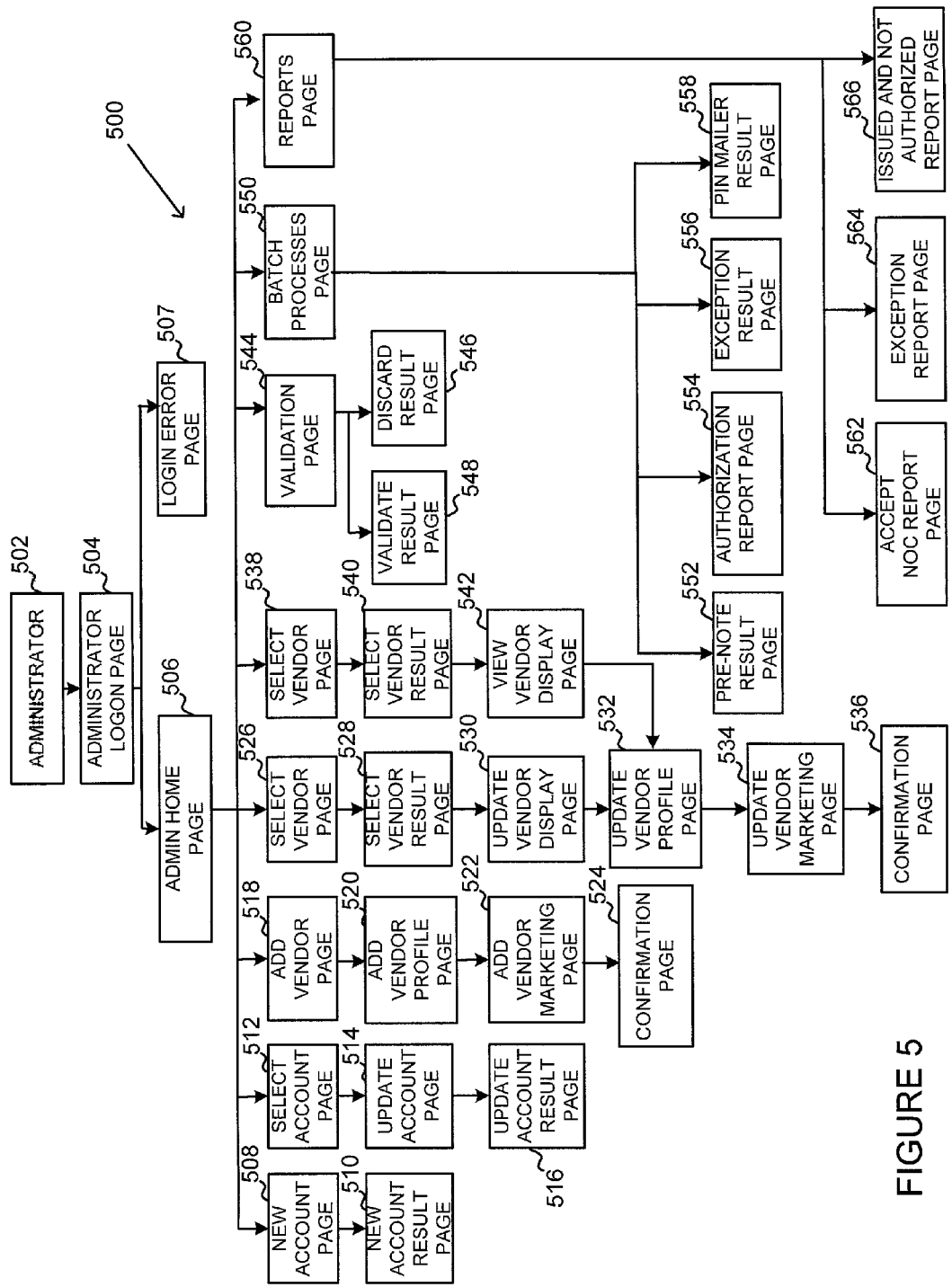

An exemplary administrator subsystem hierarchy 500 is illustrated in FIG. 5. As shown, an Administrator 502 gains access to the functionality of administrator subsystem 304 via Administrator Logon Page 504. The logon will result in accessing Admin Home Page 506 or a Login Error Page 508. Assuming the Admin Home Page 506 is reached, there are a number of options that an administrator has for viewing, updating and operating aspects of the EC Enroll system and method. Specifically, an administrator can learn about new accounts that have been opened via Page 508 and Page 510. An administrator can also select an account via Page 512, update that account via Page 514 and view an Update Account Result Page 516. Still further, an administrator can add a vendor via Page 518, add a vendor profile via Page 520, add vendor marketing information via Page 522 and view a confirmation Page 524. An administrator can also select vendors via Page 526, view a Select Result Vendor Page 528, view and update Vendor Display Page 530, view and update Vendor Profiles via Page 532, view and update Vendor Marketing information via Page 534 and a have the ability to confirm information via Confirmation Page 536. Similarly, the administrator can view a Select Vendor Page 538, a Select Vendor Result Page 540 and a view Vendor Display Page 542. Thus, as is readily apparent, an administrator can easily view profile information related to vendors (enrollees). Clients 20 may also be given access to this information and at least a subset of the web pages described above.

Also, administrator subsystem 304, as depicted by hierarchy 500 in FIG. 5, provides an administrator access to a Validation Page 544 via which a Validation Result Page 548 and a Discard Result Page 546.

A Batch Processes Page 550 is also accessible by an Administrator 502. This page preferably makes access available to a Prenote Result Page 552, an Authorization Result Page 554, an Exception Result Page 556 and a PIN Mailer Result Page 558. Finally, an Administrator 502 is preferably given access to a Reports Page 560 which provides access to an Accepted NOC Report Page 562, an Exception Report Page 564 and an Issued and Not Authorized Report Page 566. With the foregoing reports an administrator can determine if enrollees have input sufficient information to participate in an EFT program or whether PINs have been successfully generated and merged.

Figure 6:
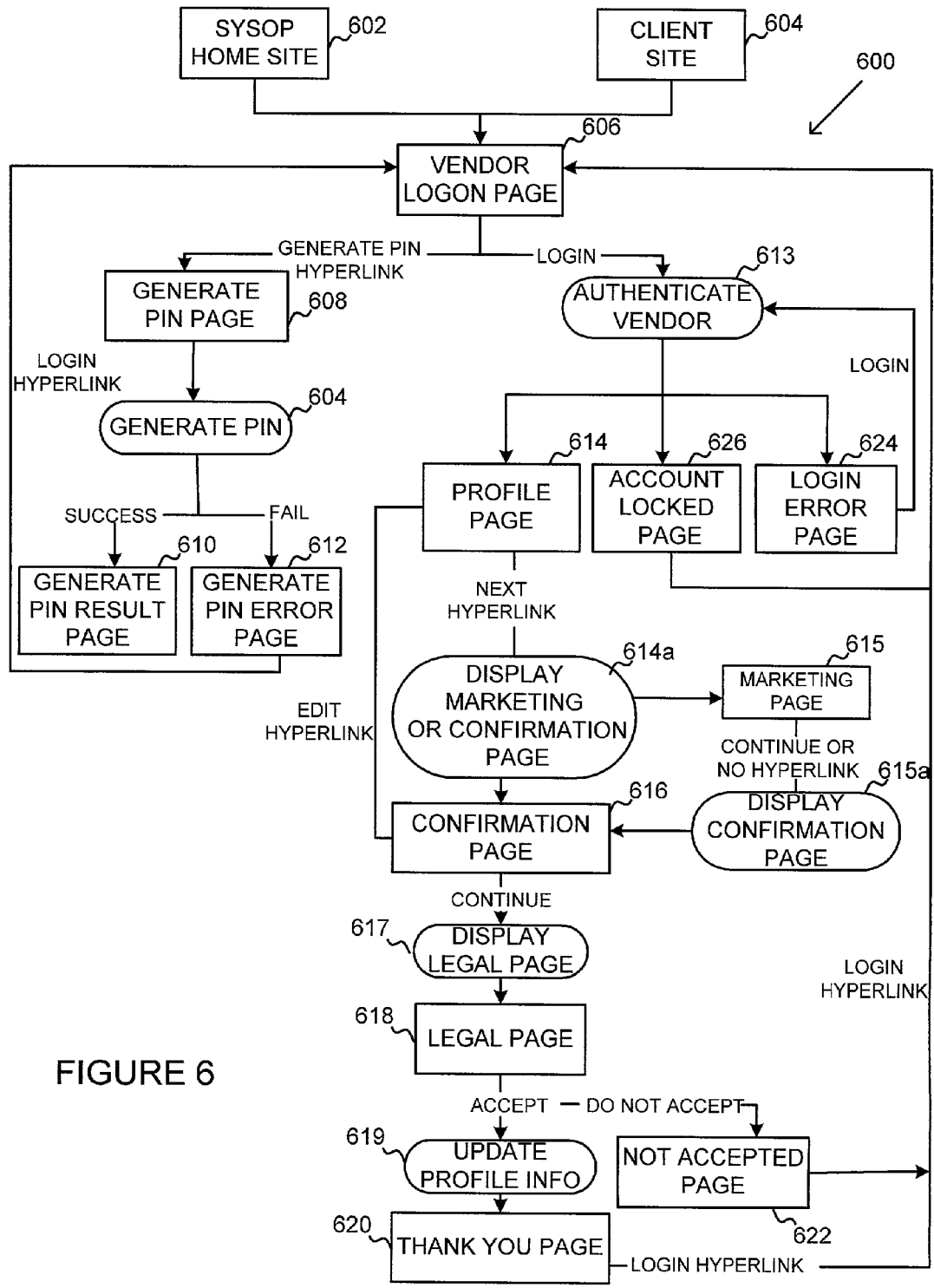
FIG. 6 illustrates an exemplary enrollment process for a vendor or enrollee in accordance with the present invention.

FIG. 6 illustrates an exemplary process in the form of a flowchart that describes a preferred operation of web server 12 and SYSOP 10 in connection with a web site that is made available to an Enrollee 30 when the Enrollee 30 decides to enroll in an electronic collection and/or disbursement plan. Specifically, beginning either at the web site belonging to SYSOP 10 or the client web site 604 an Enrollee 30 accesses vendor log-on page 606. From this page, an Enrollee 30 is preferably provided with a "generate pin" hyperlink and a "login" hyperlink. If Enrollee 30 chooses the generate pin hyperlink, the Generate PIN Page 608 is displayed in the web browser 32 of Enrollee 30 and a generate pin step 609 is commenced. The process of generating PINs is well-known to those skilled in the art. Assuming step 609 is successful, a Generate Pin Result page 610 is generated. If for some reason the step of generating a PIN fails, a Generate PIN Error page 612 is preferably presented to Enrollee 30. In either case, the process returns to the Vendor Logon Page 606 either automatically or via a button that is associated with a login hyperlink. In a preferred embodiment Enrollee 30 must wait for the generated PIN to be sent via conventional mail. Alternatively, a separate email can be sent including the PIN, which is preferably required to access to Invention web site to enroll or update profile information.

Assuming the vendor or Enrollee 30 attempts to log-in (as opposed to only requesting a PIN), then at step 613 the vendor is authenticated using, for example, a user name and the PIN that has been assigned and provided via a separate channel. If an error occurs during the inputting of login data, a Login Error Page 624 is preferably displayed and the process returns to the authenticate vendor step 613. Alternatively, if for some reason SYSOP 10 or Client 20 desires to keep Enrollees 30 from accessing their profiles or enrolling for a first time, then an Account Locked Page 626 is preferably displayed and the process returns to step 606. In implementations that do not require a PIN, the steps and features associated with PIN generation and validation are not necessary.

If, at step 613, a vendor is successfully authenticated, then at step 614 a Profile Page is displayed for Enrollee 30. This page preferably includes fields for entering company name and address, and banking information as explained previously. After clicking on a "next" button or hyperlink, it is determined at step 614*a* whether to display a marketing page or directly display a confirmation page. Assuming a marketing page is desired to be displayed, then process 600 presents Marketing Page 615 to enrollee 30. Upon clicking a "continue" or "no" button, the process continues with step 615*a* and displays a Confirmation Page at step 616. If Enrollee 30 desires to change any of the data entered at step 616 then an "edit" hyperlink or button is preferably provided which returns Enrollee 30 to step 614 where the enrollee Profile Page 614 is presented again. If, on the other hand, Enrollee 30 is satisfied with the data that has been entered, then the process continues with step 617 which causes Legal Page 618 to be presented to Enrollee 30.

If the terms on the legal page are not accepted by the enrollee at step 622 then process 600 returns to step 606. On the other hand, if the terms on the legal page are accepted, then at step 619 the profile information for the particular enrollee is updated in enrollment/maintenance database 300 of SYSOP 10. Finally, a Thank You Page 620 is preferably presented to the enrollee and then the process returns again to step 606.

FIG. 7 shows an exemplary profile information input page, in accordance with the present invention.

Once enrollment is completed successfully including data validation through the use of a pre-note or credit card authorization and other validations described herein, EC Enroll then automatically initiates payment to Client 20 on behalf of Enrollee 30. If Enrollee 30 is a payee, then EC Enroll initiates payment to Enrollee 30 on behalf of Client 20. Alternatively, if Enrollee 30 is a payor, then EC Enroll initiates payment to Client 20 on behalf of Enrollee 30. Payment is preferably performed using an EFT program such as ACH and/or credit card debits at a frequency and amount designated by Client 20 or Enrollee 30. Of course, one time payments are also clearly within the scope of the Invention.

The flexibility and value of the Invention can be illustrated by the wide-ranged services that can be provided for Clients as diverse as a state government agency, a large publicly traded company and a charitable institution. For a state government agency, for example, the SYSOP could gather information from vendors and provide this information back to the government agency to allow the agency to make variable payments to the vendors as they are billed. For a large, publicly traded company that pays dividends to its shareholders, the SYSOP could enroll the shareholders to obtain the information necessary to make electronic dividend payments directly into the shareholders' accounts. For a charitable institution, the SYSOP could enroll donors to gather information that allows the charity to accept donations electronically through periodic installments paid from the donor account. The SYSOP could further enroll customers of utilities, insurance companies or telecommunication services companies to initiate repetitive payments on behalf on Enrollees.

To amplify the example of application of the Invention to a charitable organization, the system operated by a bank can be used to collect information from the Client's (the charity's) Enrollees (donors). The system collects donation amounts, frequency of the gifts, the way the donor wants to pay and any other information needed to initiate a payment. The system then creates payment files, which it sends to payment processing engines in the bank. Though the system operator (here a bank) is collecting information on behalf of its Clients (the charity), the information is the property of the Client. Thus, the system permits the Client (here, the charity) to control access to the data and perform administrative functions through the web.

As noted above, the system can be used to facilitate periodic EFT transactions. In the case of a charity receiving donations from donors, for example, the system can be used to allow donors to fulfill a $1,000 pledge through ten periodic charges of $100 to the donor's credit card or ten periodic withdrawals of $100 from the donor's savings or checking account. In particular, the system includes processes, as previously described, for initiating authorized batch process transactions without further input from the donor. In this example, the system offers a way for charities to increase contributions through the use of installment payments, while alleviating the additional overhead of having to arrange the actual transaction every month. In a similar way, other periodic payments such as quarterly variable insurance premium payments could be made.

Since the system functions at the electronic funds transfer (EFT) level, the system can support new payment mechanisms and international types of payments, with language translation, file splitting and routing capabilities. For instance, the system can process payments to foreign countries in a variety of payment formats.

Though the system has been described in the context of a bank providing information to its Clients, other architectures are possible. For example, the system could be used in the context of an independent electronic commerce enrollment site that acts as a repository for information input by Enrollees. An Enrollee goes to a single site and enrolls in a plurality of Client sites in a single session as opposed to going to each client's web site and having a link. The Enrollee is then assigned an ID number that can be used to reference the data in her or his account.

The Invention thus provides an improved system and method for use by "Clients" (of the SYSOP) in obtaining data from their customers (Enrollees) required for transactions generally and monetary transactions in particular. The characteristic features of the system and method of the present invention, include:

The data input function is distributed to the Enrollees to alleviate the burden of data entry. Direct data entry by the Enrollee also improves accuracy.

Most of the data being entered is monitored in real time and verified either online or offline or both to ensure conformance to known standards thus ensuring greater data accuracy.

Data is automatically tested through the use of prenotes, credit card authorizations and other authorization tools, and errors or exceptions are corrected automatically to the greatest extent possible.

The enrollment process for multiple Clients can be associated with a single SYSOP. When the SYSOP is a trusted provider, such as a reputable bank, the confidence of the Client's customers in the process is enhanced.

In contrast to bill payment and presentment, which some banks offer, the Invention does not present bills for "approval" and payment. Instead, the Invention provides a system for an Enrollee to enroll one time and to give instructions for a set period of time for the system to perform a function automatically. Thus, the Enrollee (customer) is free from having to continuously revisit and repeatedly interact with the system. Also, the system is highly scalable because there is no manual intervention on the part of the SYSOP or SYSOP Client required. Finally, the system supports payments both from Client to Enrollee and Enrollee to Client.

From the vantage point of the system operator, the needs/desires of Clients must sometimes be balanced against the needs/desires of the Enrollees (the Client's clients). In contrast to known electronic bill payment and presentment systems, the system of the present invention is Client-centric and offers certain advantages to the SYSOP's Clients. For instance, the system of the Invention is designed such that the Client can control when payment is invoked, or allow the Enrollee to specify payment periodicity during the enrollment process. Preferably, the Invention includes systems and methods (e.g., customer service desks/telephone numbers) via which an Enrollee can dispute unauthorized payments. As such, the system requires only a single enrollment by the Enrollee to authorize future EFT transactions without further Enrollee intervention.

Moreover, because the process is Client-centric, both the Client and the Enrollee can be assured the Client is ready to accept and reconcile payments. In accordance with the Invention, each Client has a standard system that all Enrollees conform to by enrolling in the system. Thus, the Client need not worry about adapting to various protocols used by different bill payment and presentment vendors. Since the system is the same for all of a Client's Enrollees, it is possible to use a single system to both make payments to Enrollees and receive payments from Enrollees.

The Invention preferably also is operable across geographic boundaries. That is, the Invention preferably includes a foreign currency module that permits instantaneous conversion between different currencies thereby globally extending the reach and applicability of EC Enroll.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for use by a trusted third party, acting as system operator and intermediary between a plurality of clients of the trusted third party and the respective trading partners of the clients, to enroll the clients' trading partners in an electronic funds transfer (EFT) program, the method comprising the steps of:

providing the clients with a plurality of options for specifying requested enrollment information from a plurality of standard data fields to which predefined parameters are associated;

obtaining, from the clients of the trusted third party, data files of trading partner data that includes trading partner contact information;

creating individual trading partner records using data from the data files of trading partner data;

making the individual trading partner records available to the respective trading partners through a secure web site for enrollment in an electronic funds transfer (EFT) program;

using the contact data provided in the files of trading partner data to contact trading partners to solicit the trading partners to connect to the secure website to enroll in the electronic funds transfer (EFT) program;

presenting the trading partner with an enrollment page in which a plurality of data fields are pre-populated with data from the data files of trading partner data for the trading partner's verification;

prompting the trading partners to enter data into a plurality of data fields that have not been pre-populated with data from the data files of trading partner data;

determining, in real time, whether the data entered by the trading partner in the plurality of data fields conforms to predefined parameters and, if so, settling a payment amount in full;

subsequent to receipt of requested enrollment information, initiating an electronic fund transfer transaction to determine whether the data provided by the trading partner is sufficient to complete an electronic funds transfer and, if not, initiating corrective action that includes determining whether the data provided by the trading partner can be corrected automatically so as to be sufficient to complete an electronic funds transfer and, if so, automatically correcting the data; and associating the requested enrollment information of a trading partner enrolled in the payment program of one client of the trusted third party with a second client of the trusted third party without need to reenter the information.

2. The method of claim 1, wherein the trusted third party is a financial institution.

3. The method of claim 1, wherein the electronic fund transfer transaction initiated is a prenote, ACH transaction.

4. The method of claim 1, further comprising the step of prompting the trading partner to enter data into open form data fields according to a client's specification.

5. The method of claim 1, further comprising the step of allowing a trading partner to authorize a recurring periodic payment once and then automatically completing the requested electronic funds transfer each period without further instruction or authorization from the trading partner.

6. The method of claim 1, further comprising the step of real time credit card authorization based upon credit card information submitted by the trading partner.

7. The method of claim 1, wherein the step of presenting the trading partner with an enrollment page includes the step of presenting an enrollment page that designed uniquely for one of the trusted third parties clients.

8. The method of claim 1, wherein the trading partner is a customer of the client.

9. The method of claim 1, wherein the trading partner is a vendor.

10. The method of claim 1, wherein the trading partner is a donor.

11. The method of claim 1, wherein the step of making the individual trading partner records available to the respective trading partners through a secure web site includes the steps of assigning a personal identification number (PIN) to the trading partner and providing a webpage, secured by the PIN, for entry of data by the trading partner.

12. The method of claim 1, wherein the electronic fund transfer transaction initiated is a credit card transaction.

13. The method of claim 1, wherein the electronic fund transfer transaction initiated is a small value EFT transaction.

14. The method of claim 1, further comprising the steps of obtaining and authenticating credit card information.

15. The method of claim 1, further comprising the step of real time credit card authorization based upon credit card information submitted by the trading partner.

16. A method for use by a system operator to enroll trading partners in an electronic funds transfer (EFT) program, the method comprising the steps of:
specifying data fields for required enrollment information and associating predefined data parameters with a plurality of the data fields;
creating individual trading partner records using data from data files of trading partner information;
making the individual trading partner records available to trading partners through a secure web site for enrollment in an electronic funds transfer (EFT) program;
using the contact information provided in the files of trading partner information to contact trading partners to solicit the trading partners to connect to the secure website to enroll in the electronic funds transfer (EFT) program;
presenting the trading partner with an enrollment page in which a plurality of data fields are pre-populated with data from the data files of trading partner information for the trading partner's verification;
prompting the trading partners to enter data into a plurality of data fields that have not been pre-populated with data from the data files of trading partner information;
determining, in real time, whether the data entered by the trading partner in the plurality of data fields conforms to predefined parameters and, if so, settling a payment amount in full; and
subsequent to receipt of requested enrollment information initiating an electronic fund transfer transaction to determine whether the data provided by the trading partner is sufficient to complete an electronic funds transfer and, if not, initiating corrective action that includes determining whether the data provided by the trading partner can be corrected automatically so as to be sufficient to complete an electronic funds transfer and, if so, automatically correcting the data,
wherein trading partners that have enrolled in the electronic funds transfer (EFT) program have the data entered by the trading partner associated with that enrollment associated with an additional enrollment without need to reenter the data entered by the trading partner.

17. The method of claim 16, wherein the electronic fund transfer transaction initiated is a prenote, ACH transaction.

18. The method of claim 16, further comprising the step of real time credit card authorization based upon credit card information submitted by the trading partner.

19. The method of claim 16, wherein the trading partner is a customer of the client.

20. The method of claim 16, wherein the trading partner is a vendor.

21. The method of claim 16, wherein the trading partner is a donor.

22. The method of claim 16, wherein the step of making the individual trading partner records available to the respective trading partners through a secure web site includes the steps of assigning a personal identification number (PIN) to the trading partner and providing a web page, secured by the PIN, for entry of data by the trading partner.

23. The method of claim 16, wherein the electronic fund transfer transaction initiated is a credit card transaction.

24. The method of claim 16, wherein the electronic fund transfer transaction initiated is a small value EFT transaction.

25. The method of claim 16, further comprising the steps of obtaining and authenticating credit card information.

26. A method for use by a financial institution, acting as system operator and intermediary between a plurality of clients of the financial institution and the respective trading partners of the clients, to enroll the clients' trading partners in an electronic funds transfer (EFT) program, the method comprising the steps of:
providing the clients with a plurality of options for specifying requested enrollment information from a plurality of standard data fields to which predefined parameters are associated;
obtaining, from the clients of the financial institution, data files of trading partner data that includes trading partner contact information;
creating individual trading partner records using data from the data files of trading partner data;
making the individual trading partner records available to the respective trading partners through a secure web site for enrollment in an electronic funds transfer (EFT) program;
using the contact data provided in the files of trading partner data to contact trading partners to solicit the trading partners to connect to the secure website to enroll in the electronic funds transfer (EFT) program;
presenting the trading partner with an enrollment page in which a plurality of data fields are pre-populated with data from the data files of trading partner data for the trading partner's verification;
prompting the trading partners to enter data into a plurality of data fields in their respective trading partner records that have not been pre-populated with data from the data files of trading partner data;
determining, in real time, whether the data entered by the trading partner in the plurality of data fields conforms to predefined parameters wherein said determining in real time includes settling a payment amount in full;

subsequent to receipt of requested enrollment information initiating an electronic fund transfer transaction to determine whether the data provided by the trading partner is sufficient to complete an electronic funds transfer and, if not, initiating corrective action that includes determining whether the data provided by the trading partner can be corrected automatically so as to be sufficient to complete an electronic funds transfer and, if so, automatically correcting the data; and storing the data in the trading partner records in association with a trading partner ID so that trading partners that have enrolled in the payment program of one client of the financial institution can have the information associated with that enrollment associated with other trading partners without need to renter the information, wherein trading partners that have enrolled in the electronic funds transfer (EFT) program of one client of the financial institution have the information associated with that enrollment associated with a second client of the financial institution without need to reenter the information.

27. The method of claim 26, further comprising the step of prompting the trading partner to enter data into open form data fields according to a client's specification.

28. The method of claim 26, further comprising the step of allowing a trading partner to authorize a recurring periodic payment once and then automatically completing the requested electronic funds transfer each period without further instruction or authorization from the trading partner.

29. The method of claim 26, further comprising the step of real time credit card authorization based upon credit card information submitted by the trading partner.

30. The method of claim 26, wherein the step of presenting the trading partner with an enrollment page includes the step of presenting an enrollment page that designed uniquely for one of the trusted third parties clients.

31. The method of claim 26, wherein the trading partner is a customer of the client.

32. The method of claim 26, wherein the trading partner is a vendor.

33. The method of claim 26, wherein the trading partner is a donor.

34. The method of claim 26, wherein the step of making the individual trading partner records available to the respective trading partners through a secure web site includes the steps of assigning a personal identification number (PIN) to the trading partner and providing a web page, secured by the PIN, for entry of data by the trading partner.

35. The method of claim 26, wherein the electronic fund transfer transaction initiated is a credit card transaction.

36. The method of claim 26, wherein the electronic fund transfer transaction initiated is a small value EFT transaction.

37. The method of claim 26, further comprising the steps of obtaining and authenticating credit card information.

38. A method for use by a system operator to enroll trading partners in an electronic funds transfer (EFT) program, the method comprising the steps of:

specifying data fields for required enrollment information and associating predefined data parameters with a plurality of the data fields;

creating individual trading partner records using data from data files of trading partner information;

making the individual trading partner records available to trading partners through a secure web site for enrollment in an electronic funds transfer (EFT) program;

using the contact information provided in the files of trading partner information to contact trading partners to solicit the trading partners to connect to the secure website to enroll in the electronic funds transfer (EFT) program;

presenting the trading partner with an enrollment page in which a plurality of data fields are pre-populated with data from the data files of trading partner information for the trading partner's verification;

prompting the trading partners to enter data into a plurality of data fields that have not been pre-populated with data from the data files of trading partner information;

determining, in real time, whether the data entered by the trading partner in the plurality of data fields conforms to predefined parameters and, if so, settling a payment amount in full; and subsequent to receipt of requested enrollment information initiating an electronic fund transfer transaction to determine whether the data provided by the trading partner is sufficient to complete an electronic funds transfer and, if not, initiating corrective action that includes determining whether the data provided by the trading partner can be corrected automatically so as to be sufficient to complete an electronic funds transfer and, if so, automatically correcting the data, wherein trading partners that have enrolled in the electronic funds transfer (EFT) program have the data entered by the trading partner associated with that enrollment associated with another enrollment without need to reenter the data entered by the trading partner.

39. The method of claim 38 wherein the electronic fund transfer transaction initiated is a prenote, ACH transaction.

40. The method of claim 38, further comprising the step of real time credit card authorization based upon credit card information submitted by the trading partner.

41. The method of claim 38, wherein the step of making the individual trading partner records available to the respective trading partners through a secure web site includes the steps of assigning a personal identification number (PIN) to the trading partner and providing a web page, secured by the PIN, for entry of data by the trading partner.

42. The method of claim 38, wherein the trading partner is a customer of the client.

43. The method of claim 38, wherein the trading partner is a vendor.

44. The method of claim 38, wherein the trading partner is a donor.

45. The method of claim 38, wherein the electronic fund transfer transaction initiated is a credit card transaction.

46. The method of claim 38, wherein the electronic fund transfer transaction initiated is a small value EFT transaction.

47. The method of claim 38, further comprising the steps of obtaining and authenticating credit card information.

48. A method for use by a trusted third party, acting as system operator and intermediary between a plurality of clients of the trusted third party and the respective trading partners of the clients, to enroll the clients' trading partners in an electronic funds transfer (EFT) program, the method comprising the steps of:

providing the clients with a plurality of options for specifying requested enrollment information from a plurality of standard data fields to which predefined parameters are associated;

creating individual trading partner records pre-populated with trading partner data; assigning a personal identification number (PIN) to each trading partner;

making the individual trading partner records available to the respective trading partners through a web page, secured by the PIN, on a secure web site for enrollment in an electronic funds transfer (EFT) program;

presenting the trading partner with an enrollment page in which a plurality of data fields are pre-populated with data from the data files of trading partner data for the trading partner's verification;

prompting the trading partners to enter data into a plurality of data fields that have not been pre-populated with data from the data files of trading partner data;

determining, in real time, whether the data entered by the trading partner in the plurality of data fields conforms to predefined parameters;

subsequent to receipt of requested enrollment information initiating an electronic fund transfer transaction to determine whether the data provided by the trading partner is sufficient to complete an electronic funds transfer and, if not, initiating corrective action; and establishing trust between the clients' trading partners and the trusted third party by exposing the trusted third party's identity to the clients' trading partners.

49. The method of claim 48, wherein the trusted third party is a financial institution.

50. The method of claim 48, wherein the step of initiating corrective action includes determining whether the data provided by the trading partner can be corrected automatically so as to be sufficient to complete an electronic funds transfer and, if so, automatically correcting the data.

51. The method of claim 48, wherein the electronic fund transfer transaction initiated is a prenote, ACH transaction.

52. The method of claim 48, further comprising the step of prompting the trading partner to enter data into open form data fields according to a client's specification.

53. The method of claim 48, further comprising the step of allowing a trading partner to authorize a recurring periodic payment once and then automatically completing the requested electronic funds transfer each period without further instruction or authorization from the trading partner.

54. The method of claim 48, wherein trading partners that have enrolled in the payment program of one client of the trusted third party can have the information associated with that enrollment associated with other trading partners without need to reenter the information.

55. The method of claim 48, further comprising the step of real time credit card authorization based upon credit card information submitted by the trading partner.

56. The method of claim 48, wherein the step of presenting the trading partner with an enrollment page includes the step of presenting an enrollment page that designed uniquely for one of the trusted third parties clients.

57. The method of claim 48, wherein the trading partner is a customer of the client.

58. The method of claim 48, wherein the trading partner is a vendor.

59. The method of claim 48, wherein the trading partner is a donor.

60. The method of claim 48, wherein the electronic fund transfer transaction initiated is a credit card transaction.

61. The method of claim 48, wherein the electronic fund transfer transaction initiated is a small value EFT transaction.

62. The method of claim 48, further comprising the steps of obtaining and authenticating credit card information.

63. The method of claim 48, further comprising the step of real time credit card authorization based upon credit card information submitted by the trading partner.

64. The method of claim 48, wherein the step of creating individual trading partner records pre-populated with trading partner data comprises the steps of obtaining, from the clients of the trusted third party, data files of trading partner data that includes trading partner contact information and pre-populating a plurality of data fields with data from the data files of trading partner data for the trading partner's verification.

65. The method of claim 64, further comprising the step of using the contact data provided in the files of trading partner data to contact trading partners to solicit the trading partners to connect to the secure website to enroll in the electronic funds transfer (EFT) program.

66. A system for enrolling participants in an electronic funds transfer program by allowing a trusted third party, acting as system operator, to facilitate solicitation, enrollment, verification and electronic fund transfers between a plurality of clients of the trusted third party and a plurality of trading partners of each of the clients, the system comprising:

a database field template that includes a plurality of standard data fields to which predefined parameters are associated and means for allowing clients to select, from among the available standard data fields, data fields that will be requested as enrollment information;

an upload engine for receiving trading partner data from clients and means for using the trading partner data that includes trading partner contact information;

means for creating individual trading partner records using data from the data files of trading partner data;

a secure web site through which individual trading partner records are made available to the respective trading partners for enrollment in an electronic funds transfer (EFT) program, the web site presenting the trading partner with an enrollment page in which a plurality of data fields are pre-populated with data from the data files of trading partner information for the trading partner's verification;

means for prompting the trading partners to enter data into a plurality of data fields that have not been pre-populated with data from the data files of trading partner information;

an authentication engine for determining, in real time, whether the data entered by the trading partner in the plurality of data fields conforms to predefined parameters;

software for initiating an electronic fund transfer transaction, subsequent to receipt of requested enrollment information, to determine whether the data provided by the trading partner is test sufficient to complete an electronic funds transfer and, if not, initiating corrective action; and a database for storing the data in the trading partner records in association with a trading partner ID so that trading partners that have enrolled in the payment program of one client of the financial institution can have the information associated with that enrollment associated with other trading partners without need to renter the information, wherein trading partners that have enrolled in the electronic funds transfer (EFT) program of one client of the trusted third party have the data entered by the trading partners associated with an enrollment associated with a second client of the trusted third party without need to reenter the data entered by the trading partners, wherein the trusted third party's identity is exposed to the trading partners.

67. The system of claim 66, further comprising software for allowing a trading partner to designate a recurring payment once and then automatically perform the requested transaction each period without further instruction or authorization from the trading partner.

68. The system of claim 66, wherein the software for initiating an electronic fund transfer transaction, is software for creating a prenote, ACH transaction.

69. The system of claim 66, wherein the trading partner is a customer of the client.

70. The system of claim 66, wherein the trading partner is a vendor.

71. The system of claim 66, wherein the trading partner is a donor.

72. The system of claim 66, further comprising a foreign currency module configured to convert electronic funds from a first currency system to a second currency system.

* * * * *

UNITED STATES PATENT AND TRADEMARK OFFICE
CERTIFICATE OF CORRECTION

PATENT NO. : 8,577,794 B2
APPLICATION NO. : 09/983529
DATED : November 5, 2013
INVENTOR(S) : Sarah T. Billings et al.

Page 1 of 1

It is certified that error appears in the above-identified patent and that said Letters Patent is hereby corrected as shown below:

In the Claims

Column 21, Claim 26, Line 15:
    Please delete "renter" and replace with --reenter--

Column 22, Claim 48, Line 64:
    After "data;" insert --¶--

Column 24, Claim 66, Line 53:
    Please delete "renter" and replace with --reenter--

Signed and Sealed this
First Day of December, 2015

Michelle K. Lee
*Director of the United States Patent and Trademark Office*